(12) United States Patent
Hayama et al.

(10) Patent No.: US 7,296,323 B2
(45) Date of Patent: Nov. 20, 2007

(54) DUST COLLECTOR

(75) Inventors: Yoshimasa Hayama, Ibaraki (JP);
Daisuke Kakegawa, Ibaraki (JP);
Syuichi Okada, Fukushima (JP);
Hidekazu Harada, Kanagawa (JP);
Shigeru Shinohara, Ibaraki (JP)

(73) Assignee: Hitachi Koki Co., Ltd., Minato-ku, Tokyo (JP)

( * ) Notice: Subject to any disclaimer, the term of this patent is extended or adjusted under 35 U.S.C. 154(b) by 503 days.

(21) Appl. No.: 10/642,670

(22) Filed: Aug. 19, 2003

(65) Prior Publication Data

US 2004/0060145 A1 Apr. 1, 2004

(30) Foreign Application Priority Data

Aug. 21, 2002 (JP) ............... P. 2002-241125
Oct. 30, 2002 (JP) ............... P. 2002-316903

(51) Int. Cl.
*A47L 9/28* (2006.01)
(52) U.S. Cl. ........................ 15/339; 15/327.6
(58) Field of Classification Search ............ 15/339, 15/319, 327.6; 83/100; 340/825.69, 825.72
See application file for complete search history.

(56) References Cited

U.S. PATENT DOCUMENTS

| | | | | |
|---|---|---|---|---|
| 2,839,102 | A * | 6/1958 | Kido | 83/100 |
| 3,626,545 | A * | 12/1971 | Sparrow | 15/339 |
| 4,369,543 | A * | 1/1983 | Chen et al. | 15/319 |
| 4,611,365 | A | 9/1986 | Komatsu et al. | 15/339 |
| 5,210,532 | A * | 5/1993 | Knoedler et al. | 340/825.69 |
| 5,237,896 | A * | 8/1993 | Albright et al. | 83/61 |
| 5,256,906 | A | 10/1993 | Tsuge et al. | |
| 5,274,878 | A | 1/1994 | Radabaugh et al. | 15/314 |
| 5,343,590 | A | 9/1994 | Radabaugh | 15/319 |
| 5,363,534 | A | 11/1994 | Dekker et al. | 15/339 |
| 5,606,767 | A * | 3/1997 | Crlenjak et al. | 15/301 |
| 6,445,290 | B1 * | 9/2002 | Fingal et al. | 340/539.32 |
| 6,946,988 | B2 * | 9/2005 | Edwards et al. | 341/176 |

FOREIGN PATENT DOCUMENTS

DE 197 36 595 A1 2/1999

(Continued)

OTHER PUBLICATIONS

European Search Report dated Nov. 21, 2003.

(Continued)

*Primary Examiner*—Theresa T. Snider
(74) *Attorney, Agent, or Firm*—McGinn IP Law Group, PLLC.

(57) ABSTRACT

A dust collector includes: a motor functioning as a driving source; a drive unit for driving a motor; a dust collection fan rotated by the motor; a head section for accommodating the dust collection fan; a switch provided on the head section to control the starting of the motor; a tank section located below the head section, for accommodating dust conveyed by the dust collection fan, the tank section having a connecting portion; a duct hose having one end and the other end, the one end attached to the connecting portion, the other end being detachable from a portion of a power tool; a remote-control transmitter for transmitting a signal; and a remote-control receiver for receiving the signal from the remote-control transmitter to control the drive unit to start or stop the motor.

13 Claims, 8 Drawing Sheets

FOREIGN PATENT DOCUMENTS

| | | |
|---|---|---|
| DE | 199 02 130 A1 | 9/1999 |
| EP | 0544992 A1 * | 6/1993 |
| JP | 8-336777 | 12/1996 |
| JP | 09-24005 | 1/1997 |
| JP | 10-257579 | 9/1998 |
| JP | 11-253376 | 9/1999 |
| JP | 2001-327448 | 11/2001 |
| WO | WO97/47228 * | 12/1997 |
| WO | WO99/09875 * | 3/1999 |

OTHER PUBLICATIONS

Japanese Office Action for Application No. 2002-316903, mailed on Jul. 5, 2007, with English translation.
Japanese Office Action for Application No. 2002-241125, mailed on Jul. 5, 2007, with English translation.

* cited by examiner

DUST COLLECTOR

BACKGROUND OF THE INVENTION

1. Field of the Invention

The present invention relates to a dust collector with a remote controller and connected via a hose to a dust discharge port of a hand-held power tool for performing cutting, grinding, shaving, or the like of a workpiece.

2. Background Art

Referring to FIGS. 9 and 10, a description will be given of the conventional art. As a dust collector which is combined with a held-heldpower tool for effecting the cutting, grinding, shaving, or the like of a workpiece 12 to effect the collection and conveyance of dust discharged from the power tool, there are two kinds of systems if largely classified.

In the first system, in a state in which a cutting operation of the workpiece 12 is being effected in the direction of the arrow shown in FIG. 9, a hose 7 extending from a dust collector 4', which incorporates a motor and a dust collection fan (neither are shown), and a dust collection tank 3, is connected to a sawdust discharging port 6 of a circular saw 5 which is one of hand-held power tools. Respective power cords 8 are connected to a main power source. Hence, the circular saw 5 and the dust collector 4' are respectively provided with starting/stopping switches. First, the unillustrated starting/stopping switch of the dust collector 4' is turned on, and a suction force is generated within the hose 7 by means of the motor and the dust collection fan. Then, an operator moves to the place where the circular saw 5, which is one of power tools, is located, and turns on the starting/stopping switch to set the circular saw 5 in a state of being capable of effecting the cutting operation. Then, if the circular saw 5 is directed in the direction of the arrow, and the cutting operation of the workpiece 12 is started, sawdust produced by cutting is conveyed and collected into the interior of the dust collector 4' through the hose 7 from the sawdust discharging port 6 of the circular saw 5 by the suction force. Upon completion of the cutting operation, the starting/stopping switch of the circular saw 5 is turned off, and the operator moves and turns off the starting/stopping switch of the dust collector 4'. Although the length of the hose 7 differs depending on the details of the operation, the length is generally 5 m to 10 m in most cases. Accordingly, according to the above-described operation, the operator moves back and forth over the distance of 5 m to 10 m at maximum on each occasion of the start and end of the operation. Alternatively, only the starting/stopping switch of the circular saw 5 maybe turned off after completion of the cutting operation. However, the continuous operation of the dust collector presents a problem in terms of problems concerning noise and problems in the working environment. In addition, the continuous operation of the dust collector is not preferable from the viewpoint of energy saving.

The second system is the system shown in FIG. 10. The dust collector 4" has a motor for rotating an unillustrated dust collection fan, a socket outlet 18 for connecting to a power tool, and an interlocking device for starting and stopping the motor by detecting a working current value at the socket outlet 18. The dust collector 4" is connected to the power cord 8. The arrangement provided is such that if the power cord 8 of the power tool is connected to the socket outlet 18, the power source for the power tool and the dust collector 4" is supplied from a single power cord 8 of the dust collector 4". If the circular saw 5, which is one of power tools, is started, the motor of the dust collector 4" rotates by means of the interlocking device. The dust collection fan is rotated by the motor, and the sawdust discharged from the power tool is conveyed and collected into the dust collector 4" through the hose 7 by the suction force thus generated. In addition, if the circular saw 5, which is one of power tools, is stopped, the motor of the dust collector 4" stops by means of the interlocking device. Since the power source is supplied from the single power cord 8 of the dust collector 4", the electric capacity of either the dust collector 4" or the power tool connected thereto is restricted. In the case of a general dust collector 4", the motor capacity is 10 A to 12 A or thereabouts in a case where the power source is 100 V in the light of the problem of a required suction force. Accordingly, since the capacities of the power cord 8 and a plug are 15 A at 100 V, the capacity of the power tool which can be connected inevitably becomes 3 A to 5 A. In reality, however, if the power tool is limited to one which can be used for business use, in the case where the power source is 100 V, a power tool having a capacity of 3 A to 5 A is unusable since its power is too small. In the case of power tools which are actually used for business use, most of them have capacities of 7 A to 12 A. Accordingly, the above-described second system has been difficult to use for business use.

As described above, with the above-described first system, the electric capacity of the power tool used is within 15 A and is not restricted. However, the starting/stopping switches of the power tool and the dust collector must be operated on each occasion. Moreover, on each occasion of starting and stopping, the operator must move back and forth at least over the range of the hose 7, i.e., a distance of 5 m to 10 m or thereabouts. Hence, there has been a problem in that the operating efficiency declines remarkably.

On the other hand, with the second system, the power tool and the dust collector are operated by operating the starting/stopping switch of the power tool. However, since the power source is supplied from the single power cord of the dust collector, there has been a problem in that the electric capacity of the power tool which is connected is restricted, so that such a power tool is hardly usable for business use.

An object of the invention is to provide a dust collector of a type combined with a held-held power tool which overcomes the above-described problems, provides excellent operating efficiency, and permits the use of a power tool whose electric capacity is large. Specifically, the object is to make it possible to simply effect the starting and stopping of the power tool and the dust collector without requiring the operator to move from the-place where the power tool is used, to eliminate the restriction of the electric capacity of the power tool-used, and to increase the operating efficiency and make improvements in the working environment.

SUMMARY OF THE INVENTION

To achieve the object, the invention provides a dust collector including: a motor functioning as a driving source; a drive unit for driving a motor; a dust collection fan rotated by the motor; a head section for accommodating the dust collection fan; a switch provided on the head section to control the starting of the motor; a tank section located below the head section, for accommodating dust conveyed by the dust collection fan, the tank section having a connecting portion; a duct hose having one end and the other end, the one end attached to the connecting portion, the other end being detachable from a portion of a power tool; a remote-control transmitter for transmitting a signal; and a remote-control receiver for receiving the signal from the remote-control transmitter to control the drive unit to start or stop the motor.

BRIEF DESCRIPTION OF THE DRAWINGS

The present invention may be more readily described with reference to the accompanying drawings, in which.

DETAILED DESCRIPTION OF THE PREFERRED EMBODIMENTS

The First Preferred Embodiment

Figure 1:
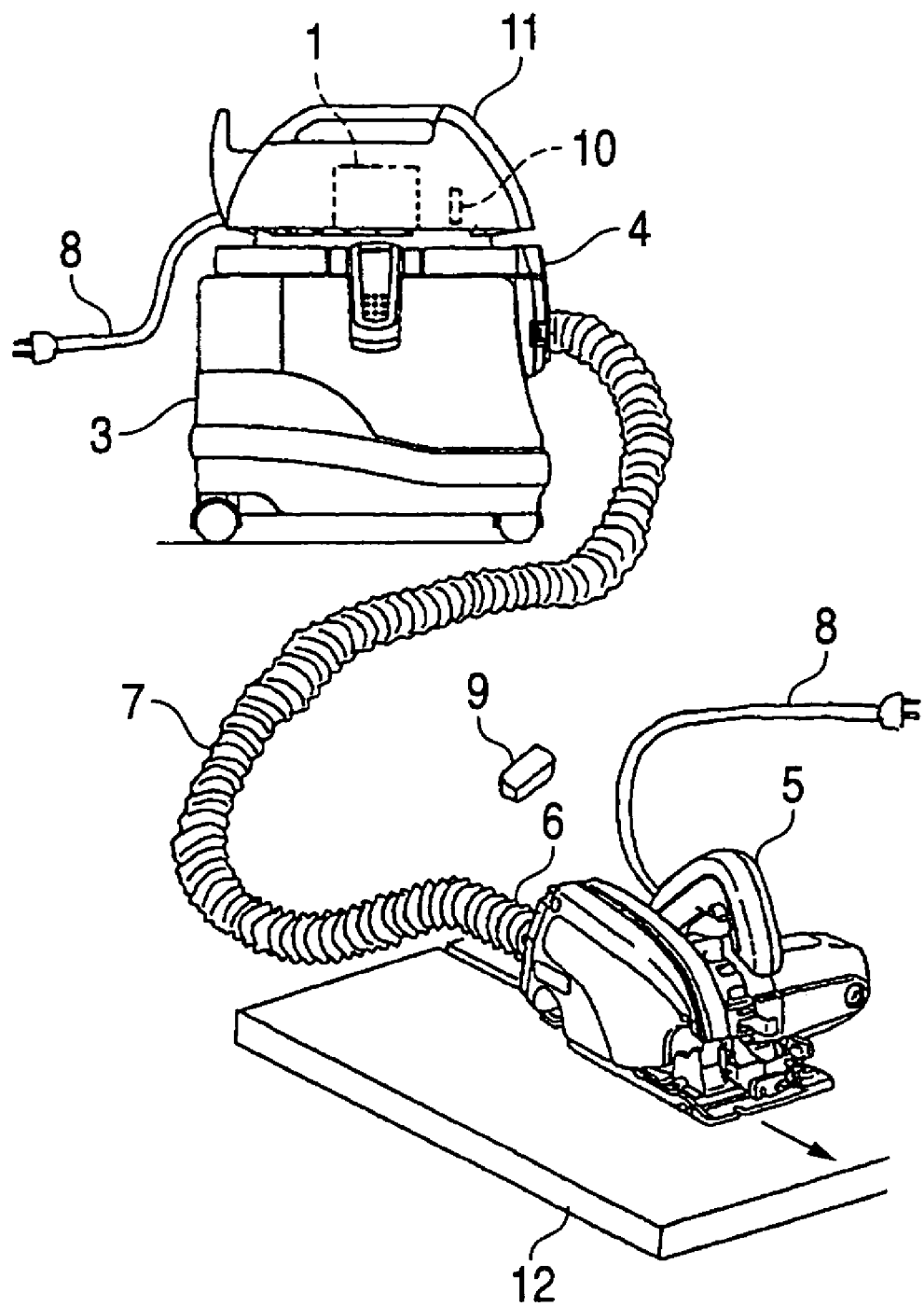
FIG. 1 is an outside perspective view illustrating a state in which a cutting operation is being performed by combining a dust collector in accordance with an embodiment of the invention and a circular saw which is one of power tools.
Figure 2:
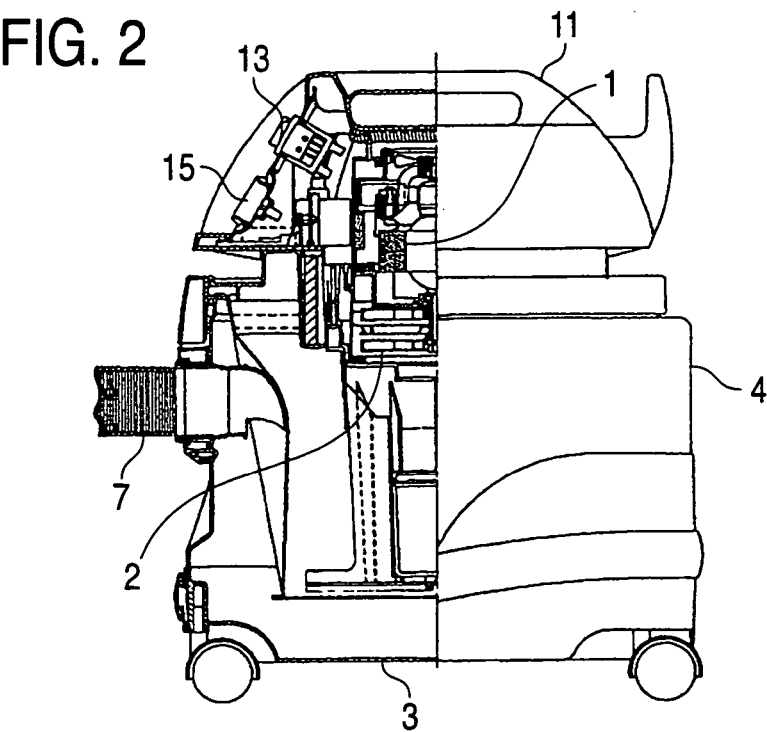
FIG. 2 is a front elevational view, partly in section, of the dust collector.
Figure 3:
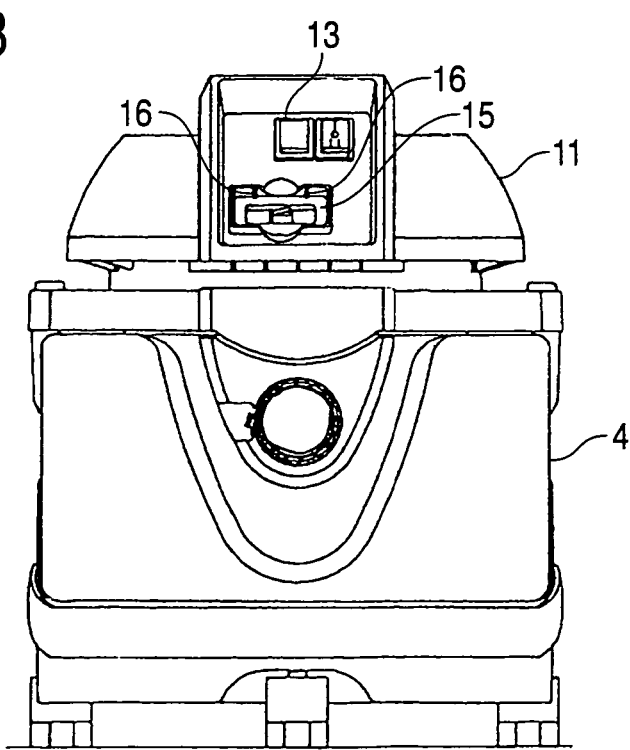
FIG. 3 is a side elevational view of FIG. 2.
Figure 4:
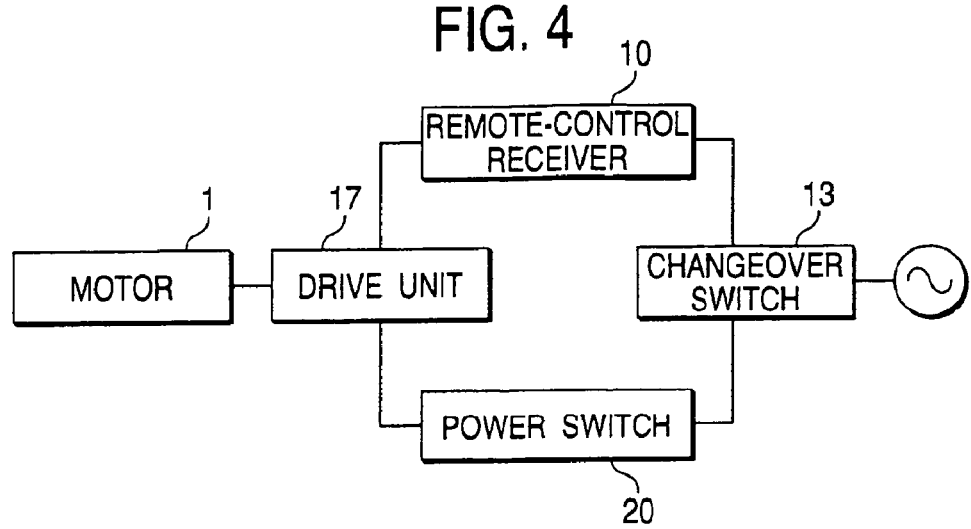
FIG. 4 is a block diagram of the dust collector.
Figure 5A:
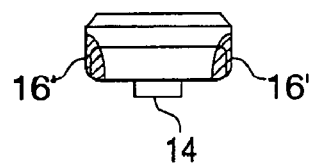
FIG. 5A is a front view of a remote-control transmitter.
Figure 5B:
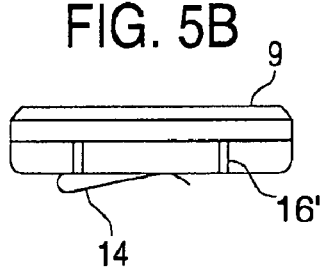
FIG. 5B is a side view of a remote-control transmitter.
Figure 5C:
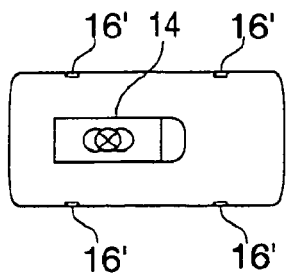
FIG. 5C is a bottom view of a remote-control transmitter.

Referring to FIGS. 1 to 5, a description will be given of a dust collector in accordance with this embodiment. FIG. 1 is an outside perspective view illustrating a state in which a cutting operation is being performed by combining the dust collector in accordance with this embodiment and a circular saw which is one of power tools. FIG. 2 is a front elevational view, partly in section, of the dust collector; FIG. 3 is a side elevational view of FIG. 2; FIG. 4 is a block diagram; and FIGS. 5A-5C are schematic diagrams illustrating a remote-control transmitter. In FIGS. 1 to 5, a hose 7 extending from a dust collector 4, which incorporates a motor 1, a dust collection fan 2, and a dust collection tank 3, is connected to a sawdust discharging port 6 of a circular saw 5 which is one of hand-held power tools. Respective power cords 8 are connected to a main power source. A remote-control transmitter 9 for transmitting a signal and a remote-control receiver 10, which effects signal processing of the signal from the remote-control transmitter 9 and starts and stops the motor 1 through an unillustrated drive unit 17, are disposed in a head section 11.

In the above-described configuration, if an unillustrated switch of the circular saw 5 is turned on, the circular saw 5 is started. If the remote-control transmitter 9 is operated at that place, a signal is received by the remote-control receiver 10 disposed in the head section 11 of the dust collector 4 located 5 m to 10 m away, which in turn causes the motor 1 and the dust collection fan 2 to rotate by means of the unillustrated drive unit 17, thereby generating a suction force within the hose 7. If the cutting operation is started while moving the circular saw 5 on a workpiece (material to be cut) 12 in the direction of the arrow, sawdust produced by cutting is conveyed into the dust collection tank 3 of the dust collector 4 by the suction force within the hose 7. After this cutting operation is performed repeatedly and the operation is completed, the unillustrated switch is turned off to stop the circular saw 5. Next, the remote-control transmitter 9 is operated from the position of the circular saw 5, and the remote-control receiver 10 located 5 m to 10 m away receives the signal. The motor 1 and the dust collection fan 2 of the dust collector 4 are hence stopped through the drive unit 17, and the suction force within the hose 7 ceases. Since the dust collector 4 and the circular saw 5 are connected to the main power source from their respective power cords 8 as described above, electric capacities of the dust collector 4 and the circular saw 5 are within 15 A and are not restricted. Since the starting and stopping of the dust collector 4 can be effected by operating the remote-control transmitter 9 from the position of the circular saw 5 located at a distance of 5 m to 10 m at maximum away from the dust collector 4, it is unnecessary for the operator to move back and forth between the place of the cutting operation and the dust collector on each occasion of the starting and stopping of the dust collector 4. Thus, it is possible to attain a substantial improvement of the operating efficiency of the dust collector 4 used by being connected to a power tool. At the same time, the starting and stopping of the dust collector 4 can be effected whenever necessary in time with the starting and stopping of the circular saw 5. Therefore, it is possible to obtain an effect in the improvement of the working environment such as noise.

In addition, a changeover switch 13 for changing over the means for starting and stopping the motor 1 of the dust collector 4 is disposed in the head section 11. If the changeover switch 13 is changed over, a changeover is made to either of a remote control system for starting and stopping the motor 1 through the remote-control receiver 10 for receiving a signal from the remote-control transmitter 9 and the drive unit 17 and a power switch system for starting and stopping the motor 1 by directly turning on and off the power supply from the power cord 8. In the invention of this application, two kinds of means for starting and stopping the motor 1 are provided, as described above.

In the above-described configuration, if the changeover switch 13 is changed over to the remote control system, the above-described operation and action based on the remote-control transmitter 9 become possible. On the other hand, if the changeover switch 13 is changed over to the power switch system, the motor 1, the dust collection fan 2, and the like of the dust collector 4 are started or stopped by turning the power switch 20 on or off. Accordingly, selection can be made according to the details of work or a preference, so that this arrangement is convenient.

In addition, a hook portion 14 having a substantially U-shaped cross section is formed at an appropriate portion of the remote-control transmitter 9 for transmitting a signal, so that the remote-control transmitter 9 can be caught and placed in an operator's chest pocket, on a belt, or the like. Hence, it is possible to prevent the missing of the remote-control transmitter 9 and improve the working efficiency. Furthermore, if the hook portion 14 is made of a material having large resiliency, such as spring steel, the remote-control transmitter 9 conveniently becomes difficult to come off.

In addition, an accommodating/retaining portion 15 for accommodating and/or retaining the remote-control transmitter 9 for transmitting a signal is provided in the head section 11 where the motor 1 and the like of the dust collector 4 are disposed. As a result, this arrangement is convenient in cases of accommodation, carriage, storage, and the like of the dust collector 4, and is also useful in preventing the missing of the remote-control transmitter 9.

In addition, projection/depression-shaped portions 16 are formed at appropriate portions of the accommodating/retaining portion 15 for accommodating and/or retaining the remote-control transmitter 9, while counterpart projection/depression-shaped portions 16' are formed on exterior portions of the remote-control transmitter 9 so as to be fitted thereto. Therefore, the remote-control transmitter 9, when not in use, can be retained in the head section 11 of the dust collector 4. Also, since there is no risk of dislocation or dropping due to vibration or the like when the dust collector 4 is carried or moved, so that this arrangement is convenient. The projection/depression-shaped portions 16' are formed up to a midpoint on both side surfaces of the remote-control transmitter 9, so that the directionality of insertion of the remote-control transmitter 9 can be provided. That direction is set such that a switch operation surface for transmission of the remote-control transmitter 9 becomes an obverse surface, so that the starting and stopping of the dust collector 4 by the remote-control transmitter 9 is made possible even in an accommodated and retained state.

It should be noted that although the circular saw 5 has been described as the power tool by way of example, a power tool other than the circular saw may be used insofar as the power tool entails the occurrence of dust or the like during the work operation.

According to the invention, respective power cords of the dust collector and the power tool used are connected to separate power sources, and the remote-control transmitter for transmitting a signal and the remote-control receiver, which effects signal processing of the signal from the remote-control transmitter and starts or stops the motor through the drive unit, are disposed in appropriate portions of the dust collector. Accordingly, the electric capacity can be used up to 15 A for both the power tool used and the dust collector. In addition, by operating the remote-control transmitter from the place of use of the power tool connected-by the hose extending 5 m to 10 m or thereabouts from the dust connector, a signal is received by the remote-control receiver disposed in an appropriate portion of the dust collector, and the starting and stopping of the motor are made possible through the drive unit. Since it is unnecessary for the operator to move back and forth over the distance from the power tool to the dust collector, the operating efficiency can be increased substantially. Furthermore, since the operation and stopping of the dust collector are possible whenever necessary, as required, problems of noise and the like can be overcome, and the working environment can be improved substantially.

In addition, the dust collector is provided with two kinds of motor starting/stopping means, i.e., the remote-control receiver for instructing the starting or stopping of the motor through the drive unit on the basis of the signal from the remote-control transmitter, as well as the power switch for starting or stopping the motor. Further, the changeover switch for effecting a changeover between the two kinds of motor starting/stopping means is disposed on the dust collector. Accordingly, selection can be made between the operation based on the remote-control transmitter and the operation based on the power switch according to the details of work or a preference, so that this arrangement is convenient.

In addition, since the hook portion having a substantially U-shaped cross section is provided at an appropriate portion of the remote-control transmitter for transmitting a signal, the remote-control transmitter can be caught and placed in the operator's chest pocket, on a belt, or the like. Hence, it is possible to prevent the missing of the remote-control transmitter and improve the operating efficiency.

In addition, the accommodating/retaining portion for accommodating and/or retaining the remote-control transmitter for transmitting a signal is provided in the head section where the motor and the like of the dust collector are disposed. As a result, this arrangement is convenient in cases of accommodation, carriage, storage, and the like of the dust collector, and is also useful in preventing the missing of the remote-control transmitter.

In addition, projection/depression-shaped portions are formed in the accommodating/retaining portion for accommodating and/or retaining the remote-control transmitter, while counterpart projection/depression-shaped portions are formed on exterior portions of the remote-control transmitter so as to be fitted thereto. Therefore, there is no risk of the dislocation or dropping of the remote-control transmitter due to vibration or the like when the dust collector is carried or moved, so that this arrangement is convenient.

The Second Preferred Embodiment

In practical use, however, it was found that a remotely controllable distance becomes limited if the system is comprised of a dust collector body having a remote-controlled receiver for discriminating and receiving a signal of extremely low power using a frequency belonging to a frequency band of 3 MHz to 3 GHz and a controlling means for controlling the dust collector on the basis of the content of the signal received by the remote-controlled receiver; an operating portion for operating the dust collector body; and a remote-controlled transmitter for transmitting the signal of extremely low power to the receiver. In addition, if a universal motor with a brush is adopted as the motor which is a driving source, the remotely controllable distance becomes substantially limited due to noise from the motor.

As described above, there have been problems in that the remotely controllable distance becomes limited, and that if a universal motor with a brush is adopted as the motor which is a driving source, the remotely controllable distance becomes substantially limited due to noise from the motor. In addition, since the receiver or a receiving antenna is provided within the height of the motor, the motor interferes with the transmitted radio wave and attenuates the radio wave depending on the direction of use of the remote-controlled transmitter. Therefore, there has been a problem in that the receiver is unable to catch the radio wave, thereby making it impossible to reliably effect the turning on and off of the dust collector.

Accordingly, an object of this embodiment is to provide a dust collector which overcomes the above-described problems, is capable of receiving a signal by a remote-controlled receiver disposed at an appropriate portion of the dust collector and of starting and stopping the motor through a drive unit, and attains a substantial increase in the operating efficiency since the operator is not required to move back and forth several meters. Another object of this embodiment is to provide a dust collector which can be operated and stopped whenever necessary, as required, thereby overcoming the problems of such as noise and substantially improving the working environment.

Figure 6:
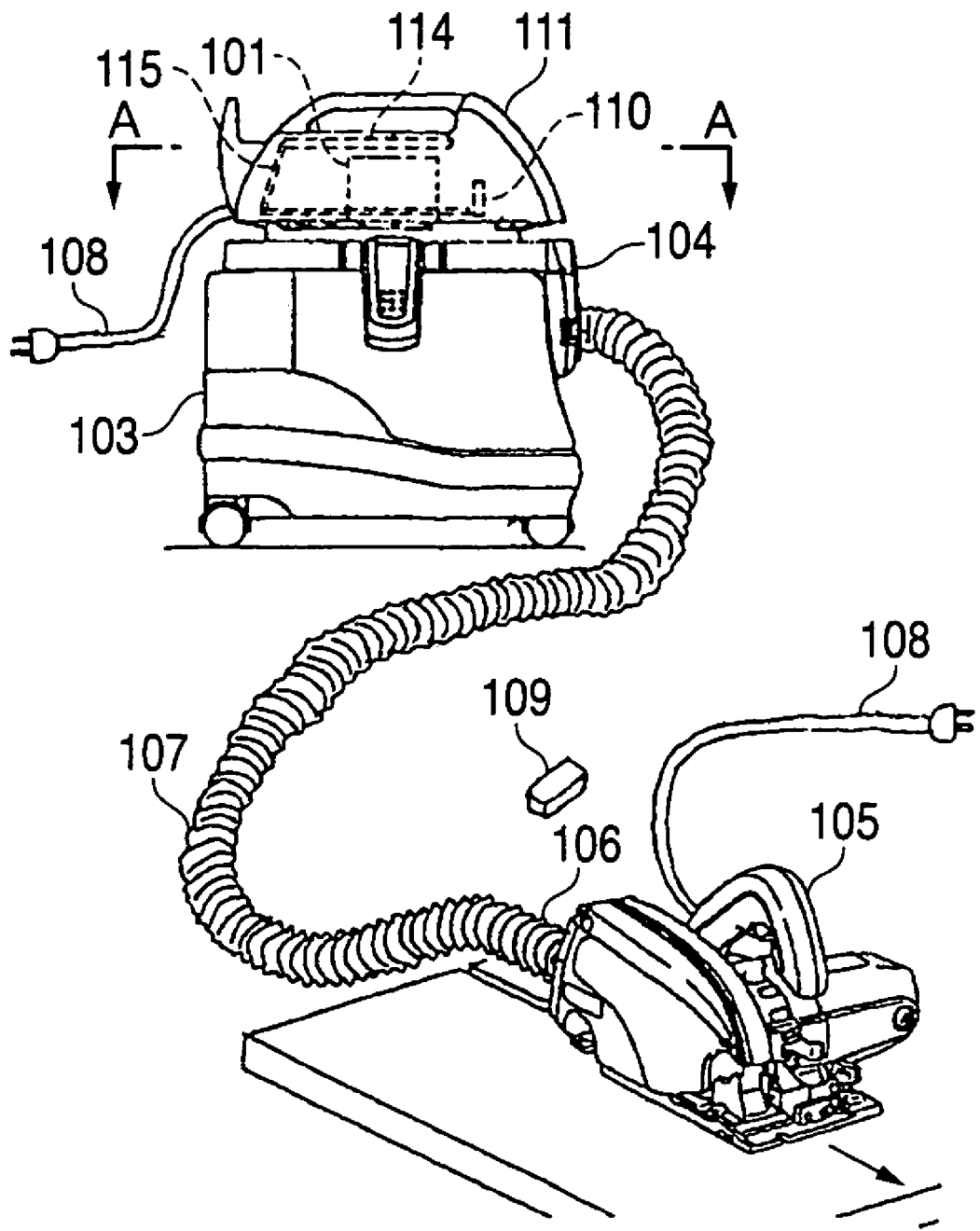
FIG. 6 is an outside perspective view illustrating a state in which a cutting operation is being performed by combining a dust collector in accordance with an embodiment of the invention and a circular saw which is one of power tools.
Figure 7:
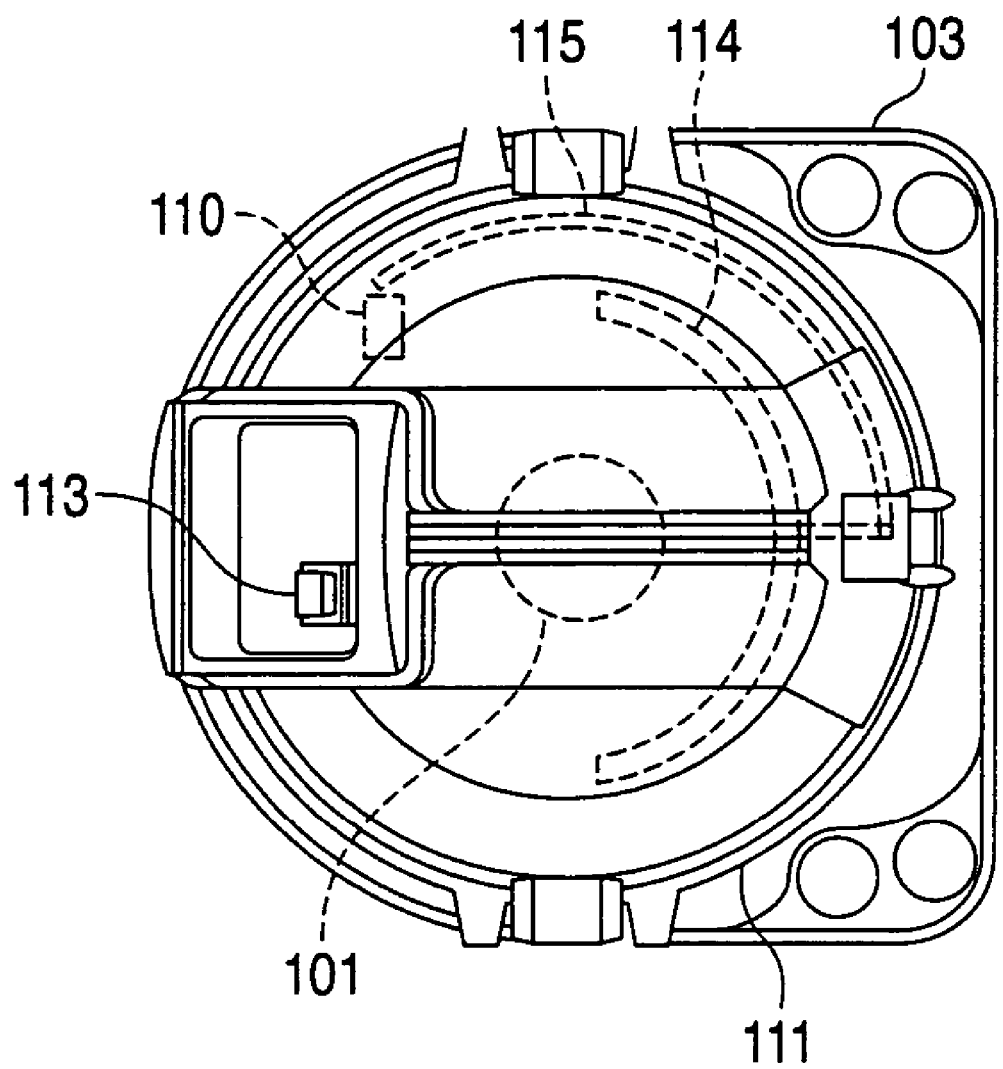
FIG. 7 is a top view of the dust collector in accordance with the invention.
Figure 8:
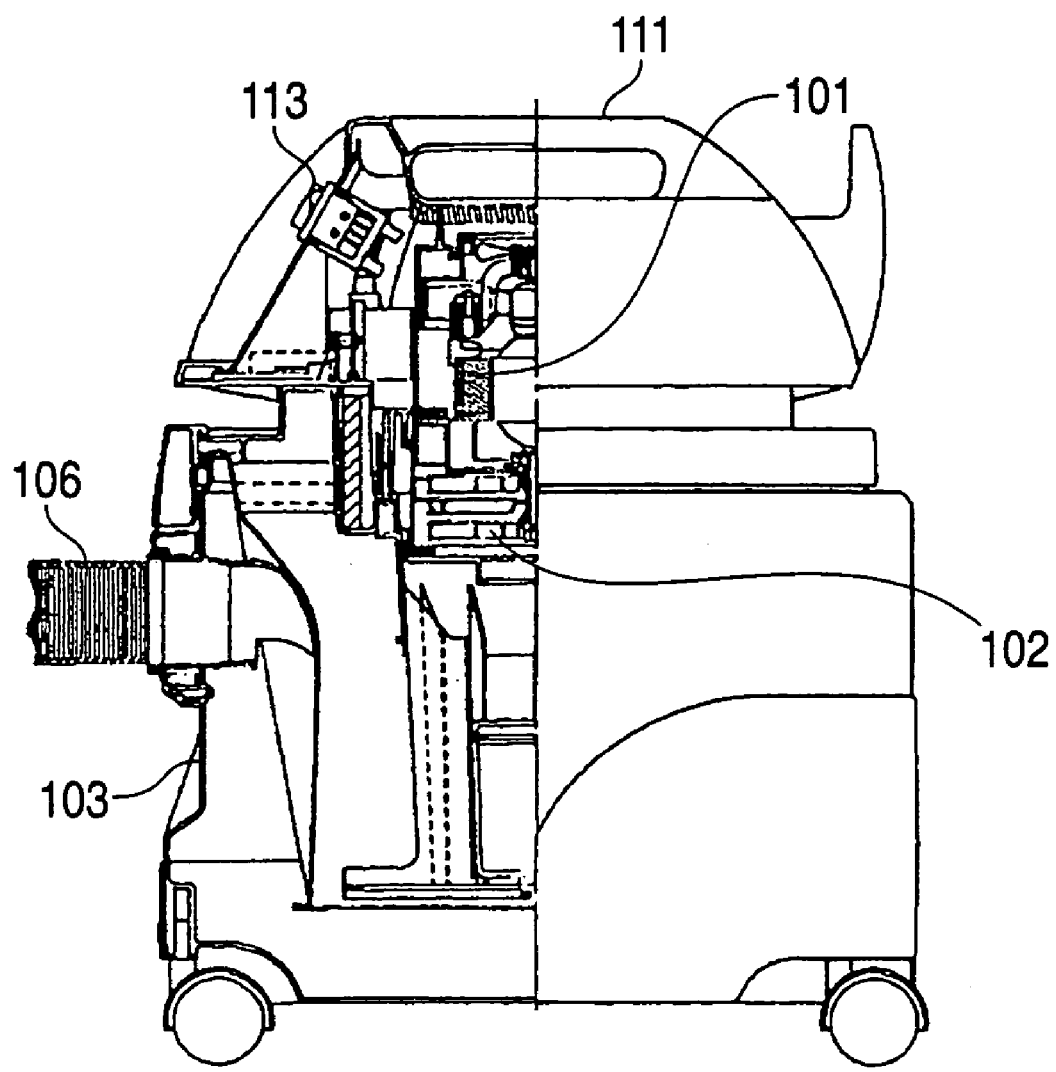
FIG. 8 is a side elevational view of the dust collector in accordance with the invention.
Figure 9:
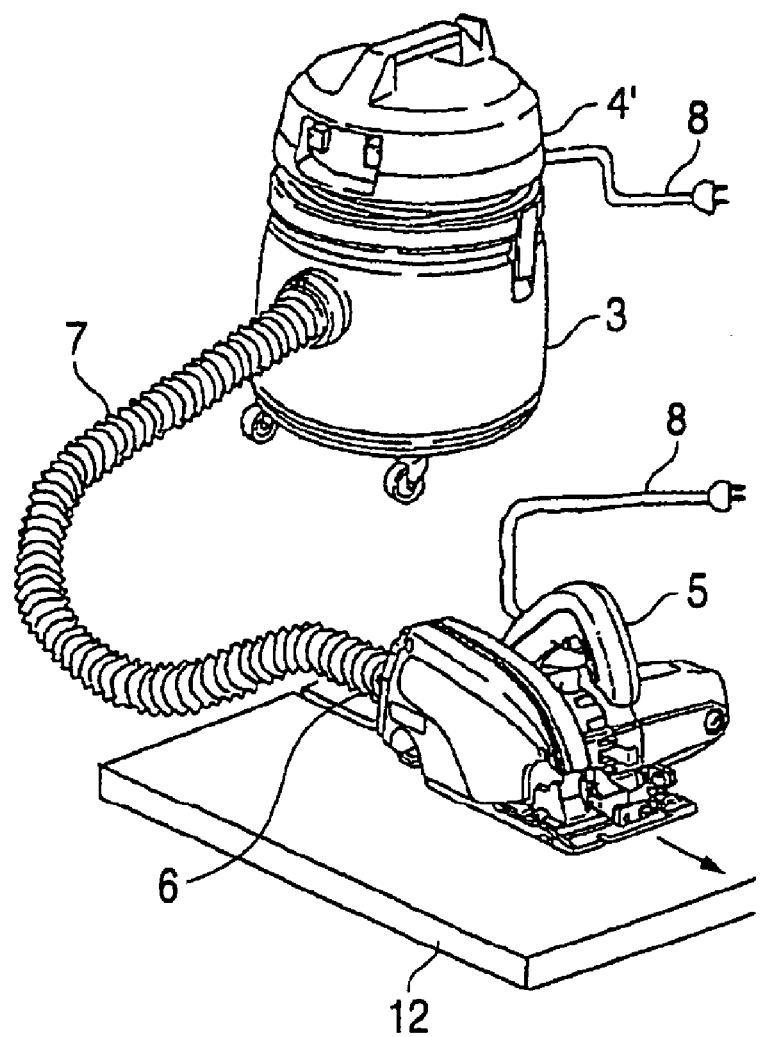
FIG. 9 is an outside perspective view illustrating a state in which a cutting operation is being performed by combining a dust collector in accordance with a first system of the conventional art and a circular saw.
Figure 10:
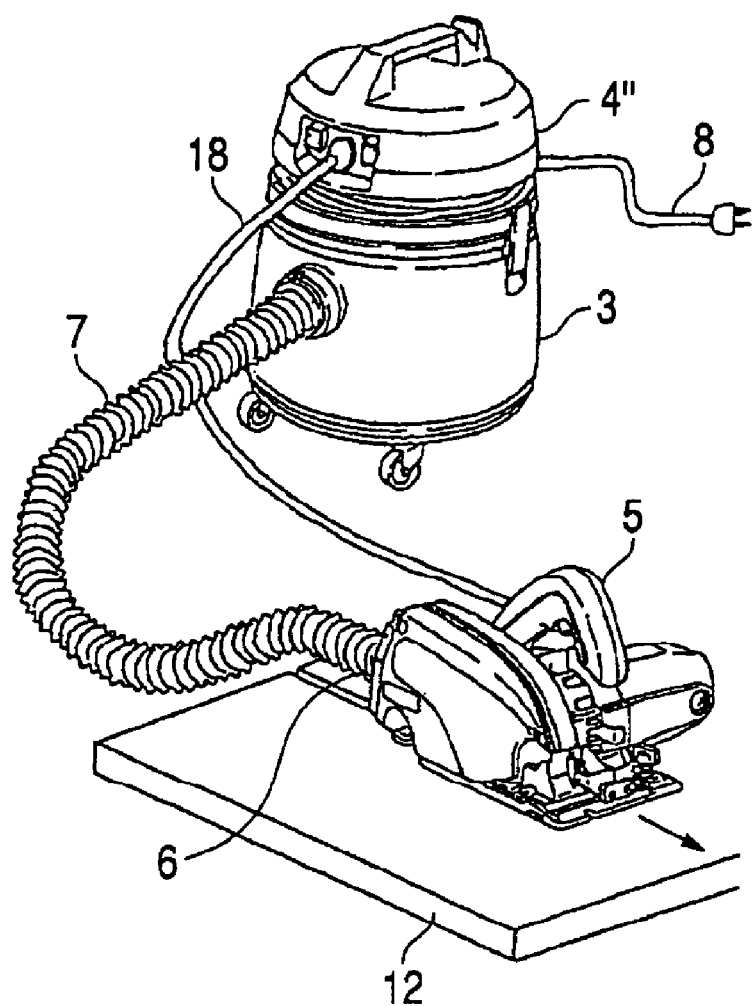
FIG. 10 is an outside perspective view illustrating a state in which a cutting operation is being performed by combining a dust collector in accordance with a second system of the conventional art and a circular saw.

Referring to FIGS. 6 to 8, a description will be given of a dust collector with a remote controller in accordance with this embodiment. FIG. 6 is an outside perspective view illustrating a state in which a cutting operation is being performed by combining the dust collector with a remote controller in accordance with this embodiment and a circular saw which is one of power tools. FIG. 7 is a top view of the dust collector with a remote controller, and FIG. 8 is a side elevational view of the dust collector with a remote controller.

In FIGS. 6 to 8 a hose 107 extending from a dust collector 104, which incorporates a motor 101, a dust collection fan 102, and a dust collection tank 103, is connected to a sawdust discharging port 106 of a circular saw 105 which is one of hand-held power tools. Respective power cords 108 are connected to a main power source. A remote-control transmitter 109 for transmitting a signal and a remote-control receiver 110, which effects signal processing of the signal from the remote-control transmitter 109 and starts and stops the motor 101 through an unillustrated drive unit, are disposed in a head section 111. It should be noted that 3 MHz to 3 GHz, more preferably 3 MHz to 322 MHz, is preferable as the frequency band.

As a receiving antenna 114, a half-wave dipole antenna, for example, is used, and is disposed above an end surface of the motor 101 in an upper portion of the head section 111. By disposing the receiving antenna 114 above an end surface of the motor 101, there are no directions in which radio waves reaching the plane A-A covered by the antenna from the transmitter are interfered by the motor 101. Hence, radio waves from any direction can be directly received by the antenna. Accordingly, it is possible to alleviate the effect of noise from the motor and enhance the reception sensitivity. In addition, in a case where the motor 101 is present in the plane A-A of the antenna 114, there is a drawback that directionality occurs in the antenna 114 since the motor 101 is a conductor. A coaxial cable 115 connects the receiving antenna and the remote-control receiver 110 by alleviating the effect of noise from the motor 101.

In the above-described configuration, if an unillustrated switch of the circular saw 105 is turned on, the circular saw 105 is started. If the remote-control transmitter 109 is operated at that place, a signal is received by the remote-control receiver 110 disposed in the head section 111 of the dust collector 104 located several meters away, which in turn causes the motor 101 and the dust collection fan 102 to rotate by means of the unillustrated drive unit, thereby generating a suction force within the hose 107. If the cutting operation is started while moving the circular saw 105 on a workpiece (material to be cut) 12 in the direction of the arrow, sawdust produced by cutting is conveyed into the dust collection tank 103 of the dust collector 104 by the suction force within the hose 107. After this cutting operation is performed repeatedly and the operation is completed, the unillustrated switch is turned off to stop the circular saw 105. Next, the remote-control transmitter 109 is operated from the position of the circular saw 105, and the remote-control receiver 110 located several meters away receives the signal. The motor 101 and the dust collection fan 102 of the dust collector 104 are hence stopped through the drive unit, and the suction force within the hose 107 ceases. Since the position of the receiving antenna 114 is located so as to obtain high sensitivity and avoid the effect of the noise from the motor 101 as described above, the starting and stopping of the dust collector 104 can be effected by operating the remote-control transmitter 109 from the position of the circular saw 105 located several meters away from the dust collector 104.

In the above-described embodiment, although, as the range which is unaffected by the motor 101, the receiving antenna is disposed above the end face of the motor in the head section 111 (on a side of the head section which is away from the dust collection tank), the receiving antenna may be disposed at any position in the dust collector insofar as that position is unaffected by the motor 101 and the like. For example, as the range which is unaffected by the motor 101, the receiving antenna may be disposed below the motor 101 inside the head section 111, specifically on an outer periphery or the inner side of the dust collection tank 103.

It should be noted that although the circular saw 105 has been described as the power tool by way of example, a power tool other than the circular saw may be used insofar as the power tool entails the occurrence of dust or the like.

According to the invention, the remote-control transmitter for transmitting a signal, the remote-control receiver, which effects signal processing of the signal from the remote-control transmitter and starts or stops the motor through the drive unit, and the receiving antenna are disposed in appropriate portions of the dust collector so as to obtain high sensitivity and avoid the effect of noise from the motor 101. Accordingly, by operating the remote-control transmitter from the place of use of the power tool connected by the hose extending several meters from the dust connector, a signal is received by the remote-control receiver disposed in an appropriate portion of the dust collector, and the starting and stopping of the motor are made possible through the drive unit. Since it is unnecessary for the operator to move back and forth several meters, the operating efficiency can be increased substantially. Furthermore, since the operation and stopping of the dust collector are possible whenever necessary, as required, problems of noise and the like can be overcome, and the working environment can be improved substantially.

What is claimed is:

1. A combination of a dust collector and a hand-held power tool comprising a power cord, said dust collector comprising:
    a motor functioning as a driving source;
    a drive unit for driving the motor;
    a dust collection fan rotated by the motor;
    a head section for accommodating the dust collection fan;
    a switch provided on the head section to control the drive unit to start and stop the motor;
    a tank section located below the head section, for accommodating dust conveyed by the dust collection fan, the tank section including a connecting portion;
    a duct hose including one end and an other end, the one end attached to the connecting portion, the other end being detachable from a portion of the power tool;
    a power cord;
    a remote-control transmitter for transmitting a signal;
    a remote-control receiver for receiving the signal from the remote-control transmitter to control the drive unit to start or stop the motor;
    a receiving antenna connected to the remote-control receiver, the receiving antenna being disposed in an area where the motor has no influence; and a changeover switch for selecting between the switch and the remote-control receiver to control the drive unit.

2. The combination according to claim 1, wherein said changeover switch controls the drive unit to one of start and stop the motor.

3. The combination according to claim 1, further comprising:
a catching hook portion including a substantially U-shaped cross section provided at the remote-control transmitter.

4. The combination according to claim 1, further comprising:
at least one of an accommodating portion for accommodating the remote-control transmitter and a retaining portion for retaining the remote-control transmitter; and
the at least one of the accommodating portion and the retaining portion is provided in the head section.

5. The combination according to claim 4, wherein at least one of the accommodating portion and the retaining portion comprises a projection/depression-shaped portion;
the remote-control transmitter comprises a counterpart projection/depression-shaped portion to be fitted to the projection/depression-shaped portion; and the counterpart projection/depression-shaped portion being formed on an exterior portion of the at least one of the accommodating portion and the retaining portion.

6. The combination according to claim 1, wherein the area where the motor has no influence is located above the motor inside the head section.

7. The combination according to claim 1, wherein the area where the motor has no influence is located below the motor inside the head section.

8. The combination according to claim 1, wherein the area where the motor has no influence is located in the tank section.

9. The combination according to claim 1, wherein connection between the receiving antenna and the remote-control receiver is effected by a coaxial cable disposed at a predetermined distance from a periphery of the motor.

10. The combination according to claim 1, wherein the changeover switch is provided on the head section.

11. A dust collection system comprising:
a remote-control transmitter for transmitting a signal;
a debris collector comprising:
a motor rotating a debris collection fan;
a tank section accommodating debris conveyed by the debris collection fan, the tank section including a connecting portion;
a duct hose attached at a first end to the connecting portion, the second end being detachable from an attaching portion of a power tool;
a drive unit for driving the motor;
a switch to control the drive unit to start or stop the motor;
a remote-control receiver for receiving the signal from the remote-control transmitter to control the drive unit to start or stop the motor;
a receiving antenna connected to the remote-control receiver, the receiving antenna being disposed in an area where the motor has no influence;
a power cord; and
a changeover switch for selecting between the switch and the remote-control receiver to control the drive unit.

12. The dust collection system according to claim 11, wherein said changeover switch controls the drive unit to start or stop the motor.

13. A dust collection system comprising:
a remote-control transmitter for transmitting a signal; and
a debris collector that functions to accumulate debris from a hand-held power tool, the debris collector comprising:
a switch to one of start and stop the function of accumulating debris;
a remote-control receiver for receiving the signal from the remote-control transmitter to one of start and stop the function of accumulating debris; and
a changeover switch for selecting between one of the switch and the remote-control receiver to start and stop the function of accumulating debris.

* * * * *